Figure 1:
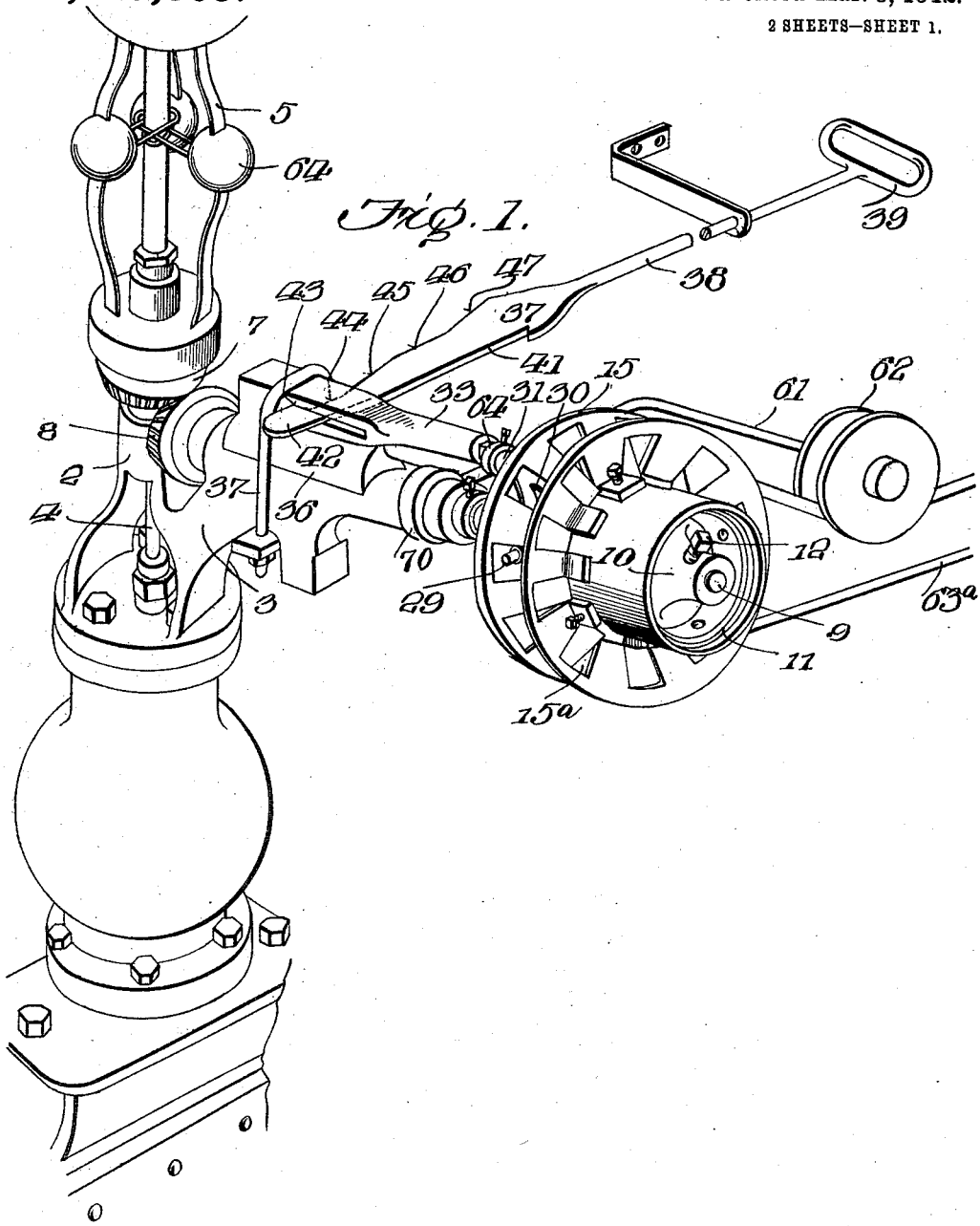

E. CRAFT.
GOVERNOR PULLEY CLUTCH.
APPLICATION FILED JUNE 18, 1909.

1,019,305.

Patented Mar. 5, 1912.
2 SHEETS—SHEET 1.

Witnesses

Inventor
Elisha Craft

By
Attorneys

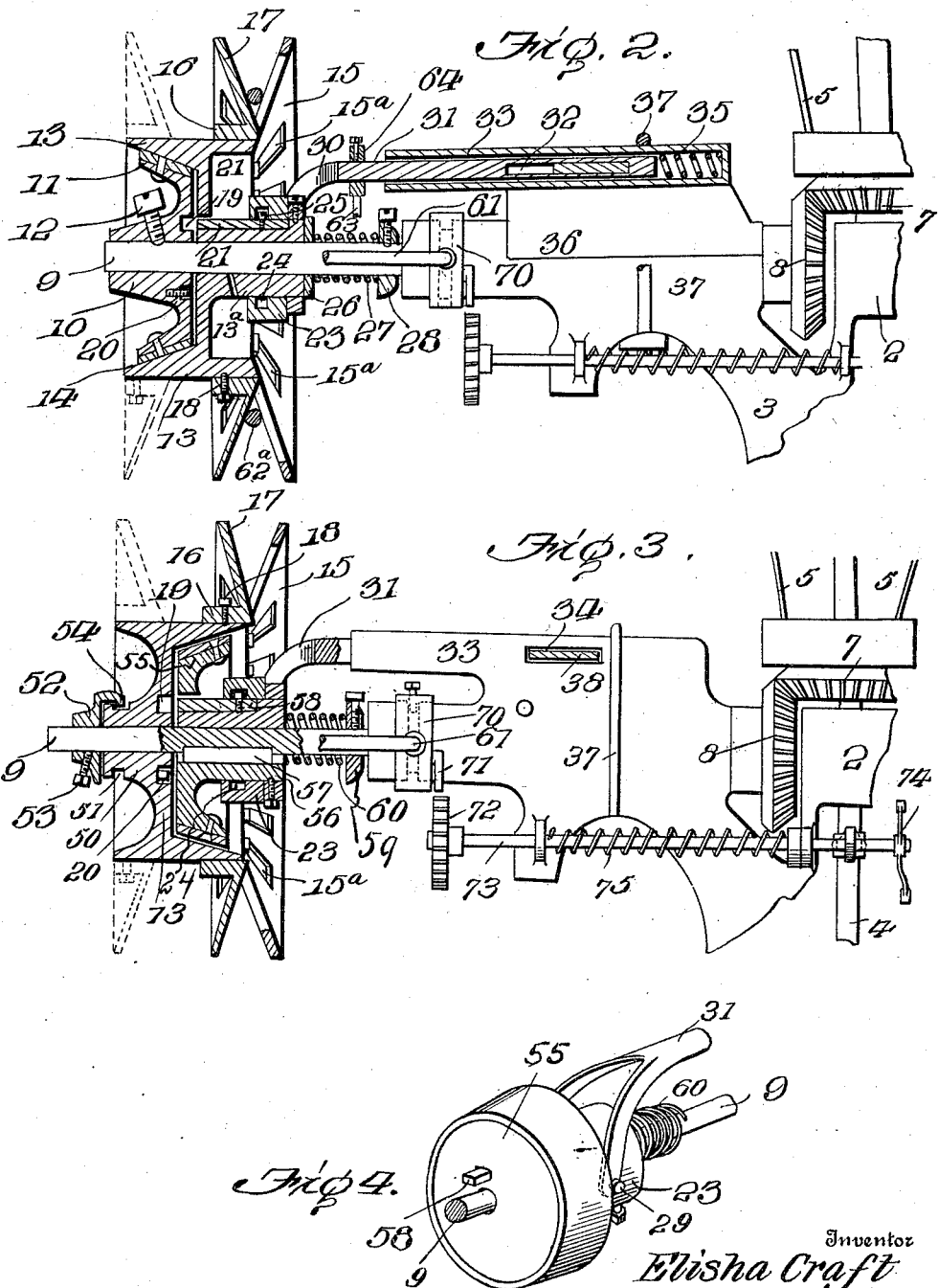

UNITED STATES PATENT OFFICE.

ELISHA CRAFT, OF WELLSBURG, WEST VIRGINIA.

GOVERNOR-PULLEY CLUTCH.

1,019,305.  Specification of Letters Patent.  Patented Mar. 5, 1912.

Application filed June 18, 1909. Serial No. 502,987.

*To all whom it may concern:*

Be it known that I, ELISHA CRAFT, citizen of the United States, residing at Wellsburg, in the county of Brooke and State of West Virginia, have invented certain new and useful Improvements in Governor-Pulley Clutches, of which the following is a specification.

This invention relates to an improved loose pulley and clutch to be used on a governor or crank shaft of steam engines, explosive engines, on line shafts, or wherever a clutch and pulley are desired for the purpose of stopping or starting machinery.

My invention comprehends the combination with a loose pulley, of a clutch element with which the loose pulley may be forced into frictional contact, and means for positively engaging the loose pulley with the clutch element, which means may be easily actuated by the engineer at any time desired, thus throwing the pulley into or out of gear with the shaft of the governor.

The invention consists further in certain other elements and combinations of parts which will be set forth in the accompanying specification and more distinctly stated in the claims.

For a full understanding of the invention and the merits thereof, and to acquire a knowledge of the details of construction, reference is to be had to the following description and accompanying drawings, in which:

Figure 1 is a perspective view of my mechanism applied to a governor; Fig. 2 is a fragmentary side elevation of my device, the pulley and its connected mechanism being in section; Fig. 3 is a like view showing a modification; Fig. 4 is a detail perspective view of the clutch member shown in Fig. 3.

Corresponding and like parts are referred to in the following description and indicated in all the views of the drawings by the same reference characters.

Inasmuch as my improved governor pulley is peculiarly adapted to governors for steam engines, I have shown it as applied to an ordinary Pickering governor, but I do not wish to be limited to this application of my invention, as it will be obvious that it may be used with any other form of governor.

The frame of the governor is designated 2 and has projecting from it the bracket 3. 4 designates the valve rod of the governor; 5 the arms; 6 the governor balls, and 7 the bevel gear which intermeshes with the bevel gear 8 on the shaft 9. Thus, the rotation of the shaft 9 rotates the bevel gear 7 and the governor balls, as is usual in these constructions.

The shaft 9 extends beyond the bracket 3 and carries upon its extremity (in the form of my device shown in Fig. 1) the friction cone 10. This friction cone has an inclined circumference, which beveled periphery is provided with a leather rim 11 preferably riveted thereto, this rim being for the purpose of making a good frictional contact between the cone 10 and the loose pulley. The friction cone is held to the shaft in any suitable manner, and I have shown for this purpose a set screw 12. The pulley 13 is provided with the hub 13$^a$ which extends along the shaft 9. The opposed face of the pulley is cut away to provide a central recess or opening having an inclined inner face 14 which is adapted to contact with the inclined outer face of the rim 11 when the pulley 13 is forced against the rim. The pulley body 13 is provided with the flange 15 which is cut away as at 15$^a$ to form a series of slots equally spaced apart and surrounding the body of the pulley. Surrounding the body 13 is a sleeve 16 having the outwardly inclined flange 17. This flange 17 is also slotted, these slots, permit one flange of the pulley to be moved laterally past the plane of the other flange. By this means the pulley may be expanded or contracted. The sleeve 16 is held in any desired position by a set screw 18.

The inner face of the friction cone 10 is annularly recessed as at 19, the recess surrounding the shaft opening through the friction cone. Located in this recess is a pin 20 which nearly fills the recess, the extremity of the pin being reduced and screwed into the body of the wheel. This pin forms a stop for engagement with a pin 21 which is shiftably mounted in a longitudinal groove 22 which extends along the outer face of the hub 13$^a$. This pin 21 is shiftable into the groove 19, and when so shifted, will contact with the pin 20 so that the pulley 13 and the friction cone will move together and be positively engaged. Surrounding the exterior of the hub 13$^a$ is a collar 23. This collar is loose upon the hub 13$^a$ and is shiftable toward and from the pulley body 13. The inner face of the collar is formed with an annular groove 24, and the stud 25 on the pin 21 projects into this groove. Thus, while the pin 21 may revolve with the hub 13ª, yet when the collar 23 is shifted longitudinally along the hub, it will force the pin 21 inward into the recess 19. Surrounding the shaft 9 is a washer 26 against which bears a coil spring 27, the other end of this spring bearing against a stop 28 which is held upon the shaft by a set screw. This stop is interposed between the end of the spring and the outer extremity of the bracket 3, so that no wear shall come upon the bracket.

In order to shift the collar 23, I provide the same with two opposed trunnion studs 29 which are pivoted in the bifurcated inwardly bent end 30 of a sliding rod 31. The shank of this rod 31 is circular in cross section and is formed with the transverse slot 32. This rod is slidingly supported in a tubular socket 33 which is also slotted, as at 34, the slot 34 coinciding with the slot 32 but being of less length. A coil spring 35 is supported in the rear end of the tubular socket and presses outwardly upon the rod 31, thus acting to force the rod 31 outward, the collar 23 toward the pulley, and to thereby force the pulley into frictional engagement with the cone 10, and the pin 21 into the recess 19 and into engagement with the stud 20. While I may make the tubular socket 33 in one piece with the bracket 3, I have found that the socket may be conveniently formed separate and supported upon an intermediate saddle 36 whose lower face is concaved to fit over the upper face of the tubular bracket 3, the socket 33 and the saddle 36 being held to the bracket by a clamp 37.

In order to shift the rod 31 within the socket, I provide the sliding bar 38 which at one end is provided with a handle 39 and at the other is flattened. This flattened blade 40 has one straight edge 41, a rounded point 42, and a shoulder 43 on its other edge, this edge being formed, rearward of the shoulder, with a straight portion 44 parallel to the axis of the rod, an inclined portion 45, another straight portion 46, and a second inclined portion 47. This rod is for the purpose of forming an operating means for the pulley to throw it into or out of engagement with the friction cone, and the rod is also adapted to be entirely removed from the socket when desired. The notched head is adapted to be inserted into the slot 34, and then the cut-away portion 43 permits the rod 31 to snap down past the head. Thus, the rod is held in position. When the blade 40 is moved inward, the inclined portion 45 will retract the rod 31 sufficiently to withdraw the pin 21 from the recess 19, and thus release the interlocking engagement between the loose pulley and the cone 10, but leaving the loose pulley in frictional engagement with the friction cone. The straight edge 46 permits the blade 40 to be left in its intermediate position, and thus to hold the parts in the position described for as long a time as may be desired, but upon a further movement inward of the blade 40, the rod 31 will be again retracted by the inclined edge 47, and the collar 23 engaging with the fixed collar 22 will entirely retract the pulley 13 from its engagement with the friction cone 10. Thus, the pulley 13 will be entirely loose upon the shaft, and the governor or whatever mechanism is connected to the shaft 9, will be entirely out of gear with the engine.

In Fig. 4 I have shown a construction which is similar to that previously described but in which the parts are reversed. In this form, the pulley body 13 is provided with an outwardly projecting hub 50, this hub having the annular groove 51 formed in it. The shaft 9 is provided with a collar 52 fastened thereto by a set screw 53, this collar having an inwardly projecting finger 54 which engages with the groove 51 and permits the loose pulley 13 to have rotative movement on the shaft, and yet holds the loose pulley in a longitudinally fixed position. The inner face of the loose pulley 13 is recessed to inclose the friction cone 55. This friction cone has a hub 56, the friction cone being keyed to the shaft 9 by a spline 57. The inner face of the pulley body 13 is annularly grooved, as at 19, in the manner previously stated, and is provided at one point of the groove with the stud 20. The hub 56 of the friction cone is longitudinally grooved, and sliding therein is the pin 58 which, like the pin 21, is adapted to project into the recess 19 and engage the pin 20. A collar 23 having therein the internal groove 24, surrounds the hub 56, and the stud on the pin 58 engages in this recess. The rear end of the hub 56 carries a collar 59 which is held thereto by a set screw. The collar 23 is shiftable upon the hub 56 as previously described, and is shifted by means of the arm 31 previously referred to. A spring 60 acts to force the hub inward and so force the friction cone 55 into frictional engagement with the pulley body. Thus, the first inward movement of the arm 31 permits the frictional engagement of the pulley with the friction cone, and the continued inward movement of the arm 31 carries the pin 58 into the groove 19 and therefore into contact with the pin 20.

Aside from the peculiar arrangement of my clutch and pulley which may be applied wherever a transmission of power is desired, the combination of this pulley with the shaft of a governor has peculiar advantages, for in traction engines for threshing, sawing and other work of that character, it is necessary to remove the governor belt every time the engine is to be changed from stationary work to traveling on the road. This is necessary because the speed of the engine when it is stationary and being used for operating machinery is not sufficient to let the engine travel fast enough to make proper time on a good road. Under these circumstances, it is customary to remove the belt from the governor every time the engine goes on the road, thus leaving the governor idle. This takes time and considerable trouble, and the putting it on and taking it off always causes more or less damage to the belt. With my invention, the removal of the belt is not necessary. It is only necessary for the engineer to push or pull upon the rod 38 or the handle 39 for him to have full control of the governor at any time without stopping the engine, so that the governor may be thrown into gear or out of gear as desired. This permits of a full boiler pressure being used in road running, a desideratum much desired by traction engineers. The governor may be put to work in an instant, or completely thrown out of gear by my invention thus saving all unnecessary wear of the governor gear and bearings.

The device, as I have shown it in Fig. 1, is also capable of attachment to any make of governor or engine.

While I have shown what I believe to be the two preferable forms of my invention, I do not wish to be limited thereto, as it is obvious that minor changes may be made in the construction and arrangement of parts without departing from the spirit of the invention itself.

Having thus described the invention, what is claimed as new is:—

1. In a mechanism of the class described, a shaft, a rotatable friction element loose on the shaft, a friction element fast on the shaft, one element being longitudinally shiftable with relation to the other, an operating rod, a supporting member formed with a socket receiving the operating rod, said operating rod and supporting member being mutually slotted, a spring urging the rod in one direction, and an operating blade insertible into said slots and having an inclined face coacting with the rod whereby the blade when shifted in one direction shifts the rod against the action of the spring.

2. In a device of the class described, a shaft, a rotatable friction element loose on the shaft, a friction element fast on the shaft, one element being longitudinally shiftable with relation to the other, an operating rod, a supporting member formed with a socket receiving the operating rod, said supporting member and the rod being mutually slotted, a pin mounted upon the longitudinally shiftable element, said pin being longitudinally shiftable and adapted when forced toward the loose element to positively engage the loose element with the friction element, said pin being connected to the operating rod, and an operating blade insertible into the slots in the rod and supporting member, said blade having one edge formed with longitudinally separated inclined edges coacting with the rod to cause a movement of the rod in one direction to a certain distance when the blade is forced in a portion of its length and when forced in its full length to entirely retract the rod to disengage the loose element from contact with the friction element.

3. In a mechanism of the class described, a shaft, a loose friction element thereon, a friction element rotatable with the shaft, one of said elements having a longitudinal movement to and from the other element, a retractable pin carried by one of said elements but independently shiftable into engagement with the other element, an abutment on the last named element adapted to engage with the said pin when the same is forced outward, a collar to which the pin is connected, an operating rod attached to the collar, a supporting member formed with a socket in which the operating rod is shiftably received, said socket and rod being mutually slotted, and an operating blade insertible into said slots and having longitudinally inclined spaced faces coacting with the rod to cause an intermittent movement of the rod as the blade is shifted.

4. In a mechanism of the class described, a shaft, a loose friction element thereon, a friction element rotatable with the shaft, one of said elements having longitudinal movement along the shaft to and from the other element, and one of said elements on its inside face being annularly grooved, a stop located in said groove, a longitudinally shiftable pin carried by the other of said elements adapted to be projected into said groove and engage the stop thereof, a collar having an interior circumferential groove located at the outer end of the pin, a stud on the pin projecting into said groove, a bifurcated rod engaging with the collar, a spring for normally forcing the rod outward and the pin into engagement with the said element, and means for retracting the rod and for retracting the longitudinally shiftable element out of engagement with the fixed element.

5. In a mechanism of the class described, a shaft, a loose pulley thereon, a friction cone rotatable with the shaft and engageable with a friction face on the loose pulley, the adjacent faces of the loose pulley and the friction cone being one provided with an annular groove having a stop located in its length, a longitudinally shiftable pin carried by the other adapted to be projected into said groove, and means for projecting the pin into said groove or retracting the same therefrom.

6. The combination with a shaft, of a support for the shaft having a transversely extending slot, the plane of said slot lying parallel to the direction of the shaft, opposed clutch members mounted on the shaft, one of said clutch members being longitudinally shiftable into and out of engagement with the other clutch member, a rod operatively connected to the shiftable clutch member extending into said support and transversely slotted, the slot in the rod registering with the slot in said support, a blade having a cam face, said blade extending through the slot in the support and the slot in the rod and acting when moved in one direction to longitudinally shift the rod in one direction relative to the support, and means for urging the rod in the opposite direction when the blade is reversely moved.

7. In a mechanism of the class described, a rotatable shaft, a loose pulley on the shaft and longitudinally movable thereon, said pulley having a friction face, a friction wheel fast on the shaft and engageable with the friction face of the loose pulley, said friction wheel having an annular groove on its inner face, a stud in said groove forming an abutment, a longitudinally shiftable pin mounted on the loose pulley and adapted to be projected into said groove and abut against said stud, a collar surrounding the hub of the loose pulley, said collar being interiorly grooved, a stud projecting from the pin into said groove, a spring acting to force the loose pulley into engagement with the friction wheel, a collar on the friction wheel adjacent to the collar for moving said pin, an arm engageable with the movable collar, a spring for forcing said arm outward and acting to force the pin into engagement with the friction wheel, and means for retracting said arm to withdraw the pin and further retracting said arm to move the shiftable collar rearward into engagement with the fixed collar and thereby retract the loose pulley from the friction wheel.

8. In a device of the class described, a rotatable shaft, a loose pulley thereon having a friction face, a friction cone thereon, said friction cone and loose pulley one shiftable into or out of engagement with the other, a longitudinally shiftable pin adapted when forced in to positively engage the loose pulley with the friction cone, a support formed with a longitudinally extending socket, an arm having connection at one end with said pin, the other end of said arm extending into said socket, a spring in said socket forcing the arm out therefrom, said arm and support being mutually slotted, and an operating blade adapted for insertion into said slot, said blade having a pointed end and an edge extending from the pointed end parallel with the axis of the blade then outwardly inclined, then again extended parallel to the blade, and then again outwardly inclined, whereby when said blade is forced in half-way, the arm shall be retracted to withdraw the pin, and when forced in the entire distance, the arm shall be retracted to disengage the loose pulley from contact with the friction cone.

In testimony whereof I affix my signature in presence of two witnesses.

ELISHA CRAFT. [L. S.]

Witnesses:
  OLIVER E. SMITH,
  OSCAR T. SMITH.

---

Copies of this patent may be obtained for five cents each, by addressing the "Commissioner of Patents, Washington, D. C."